May 1, 1962 A. SILVER 3,032,061
RELIEF VALVE
Filed Nov. 27, 1957
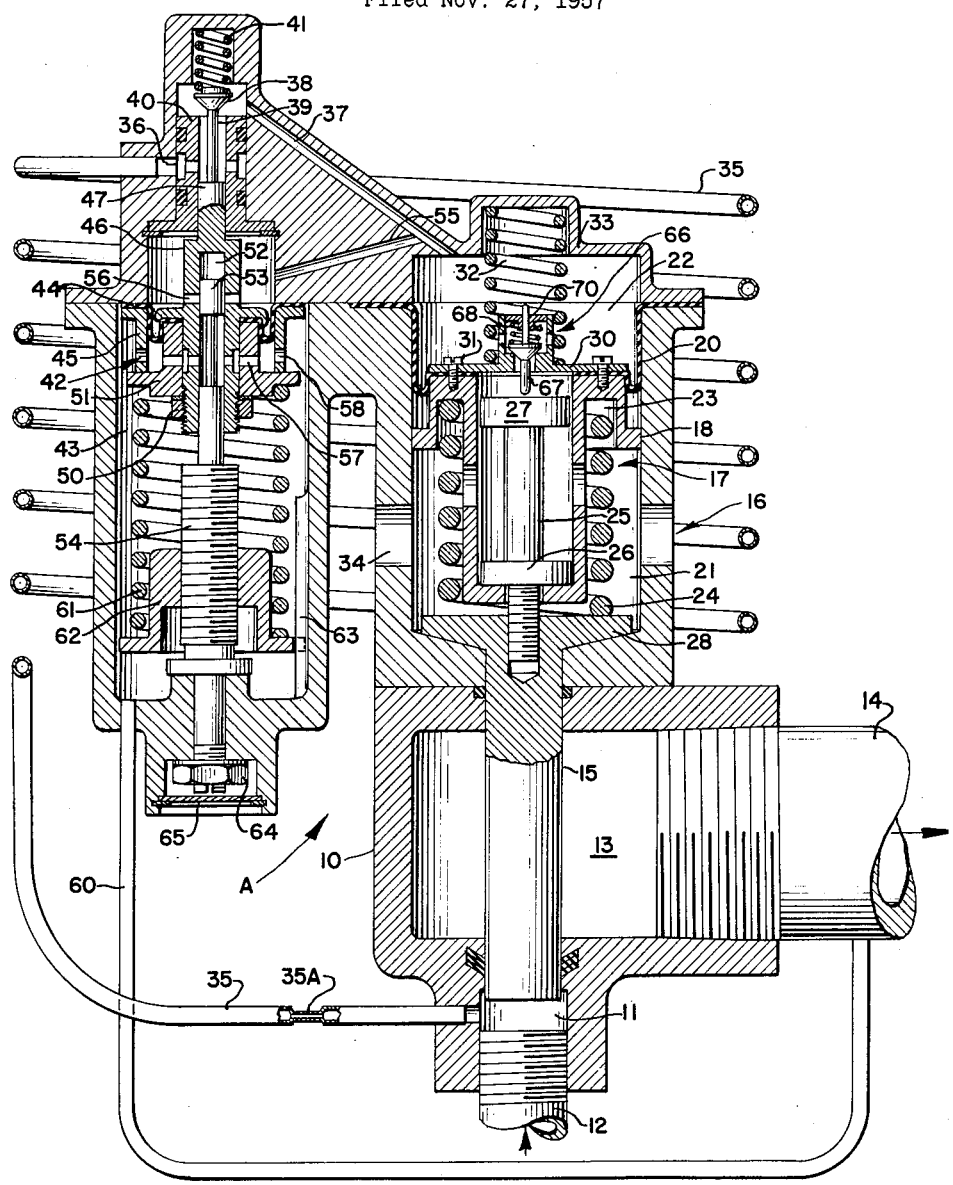
INVENTOR:
ALEXANDER SILVER,
BY Theodore E. Biber
Attorney.

United States Patent Office 3,032,061
Patented May 1, 1962

3,032,061
RELIEF VALVE
Alexander Silver, East Woodland Hills, Calif., assignor to The Garrett Corporation, Los Angeles, Calif., a corporation of California
Filed Nov. 27, 1957, Ser. No. 699,268
2 Claims. (Cl. 137—529)

This invention relates generally to valves. It is more particularly directed to relief valves for use with fluids which may be in a liquid phase at low temperatures and/or high pressures and in a gaseous phase at higher temperatures and/or lower pressures.

Another object of this invention is to provide a relief valve for limiting the pressures in a fluid system, the relief valve having a main valve section responsive primarily to a control pressure supplied by the fluid system. The control pressure is governed by a loading valve section, which is responsive to system pressure and in addition regulates the system pressure to any desired value.

Another object of the invention is to provide a relief valve suitable for use in a fluid system containing cryogenic fluids, the valve having a main valve section and a loading valve section both of which are responsive to gaseous fluid resulting from the vaporization of some of the liquid withdrawn from the system.

Still another object of the invention is to provide a relief valve for use in a fluid system and having a main valve element which is exposed to system pressure tending to move the valve toward an open position, such movement being opposed by movable means responsive to a governed fluid pressure. The fluid pressure is supplied by the system and its magnitude is governed by a loading valve section which serves first, to control the application of fluid at preferably a fraction of the system pressure to the movable means and, second, to maintain the pressure applied to the movable means at a preselected maximum value when the system pressure tends to exceed the predetermined maximum, thus permitting the main valve element to move to an open position under the force of system pressure to vent some of the fluid from the system and relieve the pressure therein.

A further object of the invention is to provide a relief valve for use in a fluid system, such valve having a main valve element which is normally urged toward open position by system pressure, such movement being governed by a control mechanism having a movable wall bearing a predetermined area ratio to the main valve element. The relief valve is also provided with a loading valve section including a first control valve for regulating the admission of fluid under pressure from the system to the control mechanism and a second control valve for controlling the exhaust of pressure fluid from the control mechanism to permit the main valve element to be moved by system pressure to vent fluid from the system.

A still further object of the invention is to provide a relief valve of the type mentioned in the preceding paragraph in which the loading valve section has a movable wall which is urged in one direction by a resilient force and in the opposite direction by fluid pressure from the system in which the relief valve is incorporated. The final stage of operating pressure of the loading valve resulting from force transmitted from the system through the main valve element and control mechanism to the control pressure fluid.

Another object of the invention is to provide a relief valve of the type mentioned in the preceding objects with a resilient motion transmitting connection between the control mechanism and the main valve element. The main valve section is also provided with a safety pilot valve which is responsive to relative movement between the main valve element and control mechanism to vent the control pressure and permit the main valve to move to an open position in the event of failure of the loading valve mechanism. The resilient motion transmitting connection may include a spring, but the action of the relief valve in relieving system pressure will be relatively unaffected by any change of load in the spring.

Other objects and advantages will be apparent from the following description considered in connection with the accompanying drawing showing a valve formed in accordance with the present invention.

In the drawing, the single FIGURE is a sectional view schematically showing a high pressure relief valve embodying the principles of the present invention.

Referring more particularly to the drawing, the valve shown therein and designated generally by the letter A, includes a body 10 which may be formed in any suitable manner. The body includes an inlet 11 to which a line 12 leading from a fluid system is attached. The valve is particularly designed for use with fluids which are in liquid phase at low temperatures and may be in the gaseous phase at high temperature, such as cryogenic fluids. The body 10 also includes an exhaust or outlet 13 from which a line 14 extends to a suitable low pressure portion of the fluid system. The valve 10 further includes a main valve element 15 which co-operates with the valve body to control communication between the inlet 11 and the outlet 13. To operate the element 15, the valve is provided with an actuating or controlling mechanism designated generally by the numeral 16, this mechanism being disposed within a chamber 17 formed in the body 10. The chamber could also be formed in a separate body section attached to the body 10, if desired.

The control mechanism 16 includes a piston element 18 disposed for sliding movement in the chamber 17, and a diaphragm 20 which divides the chamber 17 into sections 21 and 22, the latter being termed a control pressure section for reasons which will be apparent from the following description. The diaphragm 20 is secured at its edges to the body 10 and at the center portion to the piston 18, this piston having a recess 23 in the underside thereof for the reception of one end of a coil spring 24 which forms a part of a means for transmitting motion from the piston to the valve element 15. Another portion of this transmitting means includes a stem 25 which is threaded into the element 15 and is provided with spaced heads 26 and 27 disposed for movement in a depending well forming a part of piston 18.

The element 15 has a head 28 at its upper end forming an annular shoulder for engagement with the lower end of the chamber 17 to limit the movement of the element 15 in a valve closing direction. During the assembly of the device, spring 24 is positioned in engagement with the upper surface of the head 28 and piston 18 is engaged with the free end of the spring. Stem 25 with heads 26 and 27 is then inserted in the well in the piston and threaded into the element 15, the head 26 engaging the bottom of the well and moving the piston toward the element 15 to initially compress spring 24. This spring is of relatively large size to resist considerable force, the reason for which shall be set forth hereinafter.

Diaphragm 20 is clamped to the piston 18 by a top wall 30 secured to the piston with the screws 31. A coil spring 32 is disposed between the top wall 30 and a cover 33 mounted on the upper end of the body 10. The spring 32 normally urges the piston and valve assembly in a direction to prevent communication between the inlet 11 and the outlet 13 of the valve. Such movement of the piston will cause air disposed in the lower portion of the piston chamber to be displaced through openings 34 formed in the body. It will be obvious that fluid under pressure supplied to the inlet 11 will engage the lower end of the element 15 and tend to move it in an opening direction in opposition to the force exerted by the spring 32. This spring is of relatively weak force and merely serves to initially move the main valve element 15 to its closed position or return the valve to such position after pressure in the inlet has been relieved sufficiently to substantially balance opening and closing pressure.

To assist the spring 32 in resisting opening movement of the valve, control fluid pressure is supplied to the chamber 22. This fluid pressure is withdrawn from the system through a small diameter tube 35 leading from the inlet 11. The tube 35 is termed a vaporizing or warm-up tube and is coiled around the body or otherwise formed to provide sufficient capacity to permit liquid cryogenic fluids or other such material being handled to vaporize or gasify as may be necessary or desirable before being introduced into the control pressure chamber 22. Tube 35 has a restriction 35a adjacent the inlet end which tends to limit the flow of fluid to a level compatible with the capacity of the warmup coil. The feature of warming the liquid to gasifying temperatures reduces the danger of the valve controlling components sticking due to freezing which is important on valves designed to handle cryogenic fluids. Tube 35 at the outlet end thereof is connected with a bore 36 also formed in cover 33. This bore communicates at its upper end via a passage 37 with the control pressure chamber 22. It will be obvious that fluid flowing from the inlet 11 into the tube 35 will eventually be admitted to the chamber 22 where the pressure of the fluid will be applied to the upper surface of the diaphragm 20 and tend to urge the main valve element 15 in a closing direction. The area of the diaphragm forming a part of the piston assembly exposed to control chamber pressure may bear any desired ratio to the area of main valve element 15 exposed to inlet pressure. For example, assume the element 15 has an area of 1 sq. in. exposed to inlet pressure, and the diaphragm has an area of 10 sq. in. exposed to the pressure in the control pressure chamber, a pressure in the chamber 22 equal to one tenth that in the inlet, in addition to the force of spring 32 will be sufficient to maintain valve element 15 in a closed position. It is obvious that the force of spring 32 may therefore be relatively slight.

The flow of fluid through tube 35 to the control pressure chamber is governed by a poppet valve 38 disposed for engagement with a valve seat insert 40 located in the bore 36, this poppet valve 38 being urged in a closing direction by a coil spring 41 arranged between the valve 38 and the cover 33. The valve 38 has a stem 39 which engages the loading valve mechanism indicated generally by the numeral 42 and located in a chamber 43 also formed in the body 10. As previously mentioned, this body could be formed of a plurality of pieces depending upon the desire of the manufacturer. The loading valve mechanism 42 also includes a diaphragm 44, the periphery of which is clamped between the cover 33 and the outstanding leg of an annulus 45 disposed in the chamber 43 and secured to the cover 33 with screws, not shown.

This diaphragm is also secured at its central portion to a movable valve body 46 which has a guide portion 47, disposed for sliding movement in the valve seat insert 40, the poppet valve 38 being engaged with the portion 47 by the stem 39. The member 46 is threaded at its lower end to receive a nut 50 which urges a member 51 into clamping engagement with the central portion of the diaphragm 44. These elements serve to retain the member 46 in connection with the diaphragm. The member 46 is provided with a central bore 52 to receive the end 53 of a rod 54 which is secured for longitudinal adjustment in the body 10. The end 53 of the rod has a head formed thereon for co-operation with the member 46 to provide a valving action and control the flow of pressure fluid from the chamber 22. Members 46 and 53 are disposed in an outlet passage leading from the chamber 22. Such outlet passage includes a duct 55, the portion of chamber 43 above diaphragm 44, ports 56 in element 46, the bore 52 and ports 57 and 58 formed in members 51 and 45, respectively. The passage also includes a tube 60 leading from the lower end of chamber 43 to conduit 14.

The loading valve mechanism 42 also includes a coil spring 61, one end of which engages the member 51, the opposite end engaging a nut 62 through which the rod 54 is threaded, the nut being restrained against turning movement by a key or longitudinally extending lug 63 formed on the wall of the chamber 43. The lower end of the rod 54 is formed with a slot to receive a screwdriver or other instrument by which the rod may be turned to effect the longitudinal adjustment of the nut 62. This adjustment serves to vary the force of the spring 61 which opposes movement of the diaphragm 44 and other elements secured thereto, in response to force applied by fluid in the upper portion of the chamber 43 which is in open communication with the control pressure chamber 22 through the ducts 55 and 37.

When the operation of the valve is initiated, fluid from the system is introduced to the inlet 11. The pressure of this fluid will be applied to the lower end of the main valve element 15 and tend to move it in an upward direction. The system fluid will also flow through the tube 35, past the valve 38 into the control pressure chamber 22, some of the fluid also flowing through the passage 55 into the chamber at the upper side of diaphragm 44. As the system pressure in the inlet 11 increases, fluid pressure will also increase in the chambers 22 and in the portion of chamber 43 at the upper side of the diaphragm 44. The fluid pressure in chamber 22 will tend to resist opening movement of main valve element 15 as previously pointed out. It was also previously pointed out that since the area of diaphragm 20 is greater than the area of main valve element 15 exposed to inlet pressure, a relatively low pressure in chamber 22 will effectively resist opening movement of main valve element 15. This pressure will also be applied to the upper surfaces of diaphragm 44, tending to move this diaphragm and elements secured thereto in a downward direction in opposition to the force of the spring 61. As the pressure on the upper surface of the diaphragm 44 increases, spring 61 will compress and permit element 46 to move in a downward direction. The poppet 38 will follow the downward movement of the element 46 and move toward the valve seat insert 40. When poppet 38 engages the insert 40, the admission of fluid under pressure from the inlet 11 through tube 35 to chamber 22 will be interrupted. Continued increase in pressure in the inlet, however, will be applied through the main valve element 15 and piston 18, and its attached parts, will move in the upward direction and compress the fluid in chamber 22 and in the portion of chamber 43 at the upper side of diaphragm 44. The resultant increase in pressure will continue to move the diaphragm 44 and parts connected therewith in a downward direction until the ports 56 are uncovered and communication is established between chamber 22 and chamber 43 at the underside of diaphragm 44. The head 53 and the ports 56 then cooperate to prevent the fluid pressure in chamber 22 from exceeding a preselected maximum value and the force applied by the increasing pressure of the fluid in inlet 11 will move valve 15 and parts connected therewith in an upward direction establishing communication between inlet 11 and outlet 13. Fluid from the system will then be exhausted until the pressure in the system falls below the value required to maintain the valve 15 in the open position. As the valve 15 moves toward the closed position the pressure on the upper surface of the diaphragm 44 will decrease and spring 61 will move the valve body 46 upward, thus closing the ports 56 and opening valve 38 to admit pressure from the system to chamber 22. This pressure and the force of spring 32 will retain the main valve element 15 in a closed position until a succeeding cycle of operation is initiated.

The preselected maximum pressure at which the main valve element 15 will open will be determined by the setting of the loading valve spring 61. This setting may be varied through the adjustment of rod 54 as previously pointed out. The rod may be locked in any position of adjustment by a nut 64 threaded on the lower end of the rod. Access to the nut and rod for adjustment may be had by removing a cover plate 65 from the housing 10 at the lower end of the portion containing the pilot valve.

As pointed out in the objects, the main valve A is also provided with a safety pilot valve indicated generally by the numeral 66. This safety pilot valve includes a poppet valve 67 disposed to close an opening in the center of the top wall 30 of piston 18. Poppet 67 is urged to a closed position by a small spring 68 disposed between the poppet valve and a disc 70 which closes the upper end of a hollow boss formed on the upper surface of top plate 30 of piston 18. This boss provides a chamber to receive the safety pilot valve. The sides of the boss have ports through which fluid may flow when the valve 67 is unseated, from chamber 22 through the piston and outwardly to the atmosphere or other region of lower pressure through ports 34. The safety pilot valve is mechanically actuated through the engagement of stem 25 with a portion depending from valve 67. Normally the lower end of this portion is spaced slightly from the upper end of stem 25, this spacing being maintained during the normal operation of the device. If, however, the loading valve 42 should fail to function, and pressure would increase excessively in the system, the motion transmitting connection between piston 18 and main valve element 15 will permit the latter to move relative to the piston until the stem 25 moves valve 67 to an open position and vents the control pressure chamber 22. At this time, fluid pressure in the inlet port will move valve element 15, together with the operating piston 18 and its attached parts, to a valve open position in the usual manner. Since the relative movement between valve 15 and piston assembly 18 required to effect the opening of the safety pilot valve 67 is slight, no change in rate of spring 24 will result.

While the invention has been shown schematically in one form only, it is obvious that many different arrangements of the structure are possible without departing from the principles of the invention.

I claim:
1. A relief valve comprising a body forming a chamber with an inlet and an outlet; a valve element disposed in said body for movement in response to inlet pressures to control communication between said inlet and outlet; means in said body initially loading said valve element toward a closed position; means for governing the operation of said valve element, said means having a control pressure chamber; a movable member in said body connected at one side with said valve element and exposed at the other side to said control pressure chamber, fluid pressure in said control pressure chamber tending to retain said valve element in position to prevent communication between said inlet and outlet; means forming a relatively movable connection between said movable member and said valve element; means forming a passage establishing limited communication between a pressure source and said control pressure chamber; normally open valve means in said passage; a loading valve responsive to predetermined fluid pressure in said control pressure chamber to establish fluid flow therefrom to a zone of lower pressure, said loading valve being disposed to engage the valve means in said passage so that the valve means moves to closed position when said loading valve moves a predetermined distance toward open position; and a safety pilot relief valve carried by said movable member and disposed to be opened in response to a predetermined amount of relative movement between said movable member and said valve element.

2. A relief valve comprising a body forming a chamber with an inlet and an outlet; a valve element disposed in said body for movement in response to inlet pressures to control communication between said inlet and outlet; means for governing the operation of said valve element having a control pressure chamber; a diaphragm assembly disposed in said body with one side exposed to said control pressure chamber; means forming a relatively movable connection between said diaphragm assembly and said valve element, fluid pressure in said control pressure chamber tending to load said valve element to prevent communication between said inlet and outlet; means forming a passage for introducing fluid pressure to said control pressure chamber; normally open valve means for controlling fluid flow through said passage; a loading valve responsive to predetermined fluid pressure in said control pressure chamber to establish fluid flow therefrom, said loading valve being disposed to actuate the valve means in said passage; a safety pilot valve carried by said diaphragm assembly and disposed to be opened in response to predetermined relative movement between said diaphragm assembly and said valve element; and means associated with said pilot valve forming a passage for establishing fluid flow from said control pressure chamber to a zone of lower pressure when said pilot valve is in open position.

References Cited in the file of this patent
UNITED STATES PATENTS

| | | |
|---|---|---|
| 521,315 | Hoffman | June 12, 1894 |
| 868,030 | Tanner | Oct. 15, 1907 |
| 2,375,410 | Gondek et al. | May 8, 1945 |
| 2,574,414 | Ragland | Nov. 6, 1951 |
| 2,663,121 | Ramsey | Dec. 22, 1953 |
| 2,736,337 | Parks et al. | Feb. 28, 1956 |
| 2,761,464 | Faust | Sept. 4, 1956 |
| 2,808,068 | Thomas | Oct. 1, 1957 |
| 2,940,463 | Balfour | June 14, 1960 |